US010005173B2

(12) United States Patent
Furey

(10) Patent No.: US 10,005,173 B2
(45) Date of Patent: Jun. 26, 2018

(54) RAFTER ANGLE SQUARE DOOR CLAMP STAND SYSTEM

(71) Applicant: Charles H Furey, Toms River, NJ (US)

(72) Inventor: Charles H Furey, Toms River, NJ (US)

(*) Notice: Subject to any disclaimer, the term of this patent is extended or adjusted under 35 U.S.C. 154(b) by 126 days.

(21) Appl. No.: 15/181,871

(22) Filed: Jun. 14, 2016

(65) Prior Publication Data

US 2017/0043454 A1 Feb. 16, 2017

Related U.S. Application Data

(60) Provisional application No. 62/204,662, filed on Aug. 13, 2015.

(51) Int. Cl.
| | | |
|---|---|---|
| *A47F 1/12* | (2006.01) | |
| *E04F 21/00* | (2006.01) | |
| *B62B 3/10* | (2006.01) | |
| *B25B 5/14* | (2006.01) | |
| *B25B 5/00* | (2006.01) | |
| *E05B 17/00* | (2006.01) | |

(52) U.S. Cl.
CPC .............. *B25B 5/147* (2013.01); *A47F 1/126* (2013.01); *B25B 5/006* (2013.01); *B25B 5/145* (2013.01); *E04F 21/0023* (2013.01); *E05B 17/0012* (2013.01); *B62B 3/108* (2013.01)

(58) Field of Classification Search
CPC ..... B62B 1/268; B62B 3/108; Y10S 269/905; E04F 21/0023; E04F 21/18; B25B 5/147; B25B 5/006; B25B 5/145; E05B 17/0012; A47F 1/126; A47B 65/10; A47B 65/20; G07F 9/026
USPC ................... 269/905, 88, 17, 133; 280/79.7; 211/59.3, 43
See application file for complete search history.

(56) References Cited

U.S. PATENT DOCUMENTS

| | | | | |
|---|---|---|---|---|
| 113,830 | A | * 4/1871 | Anderson | ............. B62B 5/0083 |
| | | | | 105/385 |
| 525,186 | A | * 8/1894 | Bowley | .................. B65D 85/68 |
| | | | | 206/335 |

(Continued)

FOREIGN PATENT DOCUMENTS

| | | | |
|---|---|---|---|
| CA | 1194047 | * | 9/1985 |
| GB | 2394916 | * | 11/2002 |

*Primary Examiner* — Christopher M Koehler
*Assistant Examiner* — Mahdi H Nejad
(74) *Attorney, Agent, or Firm* — Stuart M. Goldstein

(57) ABSTRACT

A rafter angle square door clamp stand system functions like a truss, utilizing tension and compression. A horizontal tension base is suspended off of the ground by rotatable support members, one at each end of the base. The tension base has a "T" shaped slot that runs the length of the base. Two rafter angle squares, each having a "T" shaped member, slide into the slot of the base, one from each end of the base, with the vertical edges of the angle squares facing each other. The weight of the door on the tension base causes the base to flex downward, and the rafter squares to compress, holding the door in an upright position. Stop elements prevent the angle squares from moving backwards when the door is compressed and clamped. The system can be converted to support cylindrical objects, by reversing the positions of the angle squares.

6 Claims, 4 Drawing Sheets

(56) References Cited

U.S. PATENT DOCUMENTS

| | | | | |
|---|---|---|---|---|
| 611,340 A * | 9/1898 | Smith | ................. | B25B 11/00 |
| | | | | 269/133 |
| 848,837 A * | 4/1907 | Schneider | ........... | E04F 21/0023 |
| | | | | 269/133 |
| 1,237,101 A * | 8/1917 | Ryan | ................. | A47B 65/00 |
| | | | | 211/43 |
| 1,606,634 A * | 11/1926 | Hinds | ................. | E04F 21/0023 |
| | | | | 269/102 |
| 2,076,462 A * | 4/1937 | Horechney | ............. | B25F 1/003 |
| | | | | 269/9 |
| 2,684,765 A * | 7/1954 | Lowenstein, Jr. | ...... | A47B 65/10 |
| | | | | 211/43 |
| 3,301,407 A * | 1/1967 | Jones | ................. | A47B 57/586 |
| | | | | 108/61 |
| 3,318,454 A * | 5/1967 | Donlin | ................. | A47B 57/585 |
| | | | | 211/43 |
| 5,169,114 A * | 12/1992 | O'Neill | ............... | E05B 73/0082 |
| | | | | 248/316.4 |
| 5,205,420 A * | 4/1993 | Petryszak | .............. | A47B 65/00 |
| | | | | 211/184 |
| 5,294,099 A * | 3/1994 | Dalfino | ................. | B25B 11/00 |
| | | | | 269/133 |
| 5,740,926 A * | 4/1998 | Mulloy | ................ | A47B 57/585 |
| | | | | 108/28 |
| 5,775,036 A * | 7/1998 | Stanley, Sr. | ......... | E04F 21/0015 |
| | | | | 248/354.4 |
| 6,974,041 B2 * | 12/2005 | Salemi | ................. | A47B 57/585 |
| | | | | 211/184 |
| 8,678,326 B2 * | 3/2014 | Vito | ................. | A63B 55/50 |
| | | | | 248/346.01 |
| 2004/0217531 A1* | 11/2004 | Yates | ................. | B25B 1/125 |
| | | | | 269/184 |
| 2012/0234851 A1* | 9/2012 | Zacherle | ................. | A47F 1/126 |
| | | | | 221/1 |

\* cited by examiner

RAFTER ANGLE SQUARE DOOR CLAMP STAND SYSTEM

PRIOR RELATED APPLICATION

This application claims the benefit of provisional application 62/204,662, filed on Aug. 3, 2015.

BACKGROUND OF THE INVENTION

There have been many types of clamp stands for maintaining doors, wall panels, and other relatively narrow, elongated work pieces in upright positions, in order to perform various types of work, including cutting, trimming, painting, edge planing, and installation of door hinges and other hardware. Prior clamp stands have generally utilized upstanding clamp members, secured in some fashion to a base. Some other stands have used swinging, slideable, or lever operated components to clamp work pieces.

SUMMARY OF THE INVENTION

It is the object of the present invention to overcome the disadvantages and limitations of prior door clamp stands and specifically rafter angle square door clamp stands, by providing such a stand which is unique and versatile in design, easier and more efficient to use, simple to store, and economical to manufacture.

These and other objects are accomplished by the present invention, a rafter angle square door clamp stand system which functions like a truss, utilizing tension and compression. A horizontal tension base is suspended off of the ground by two rotatable support members, one at each end of the base. The tension base has a "T" shaped slot that runs the length of the base. Two rafter angle squares, each having a "T" shaped member, slide into the "T" slot of the base, one from each end of the base, with the vertical edges of the angle squares facing each other. The weight of the door or similar elongated panel on the tension base causes the base to flex downward, and the rafter squares to compress holding the door in an upright horizontal position. Stop elements prevent the angle squares from moving backwards when the door is compressed and clamped. The system can also be converted to support cylindrical objects, by reversing the positions of the angle squares.

The novel features which are considered as characteristic, of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
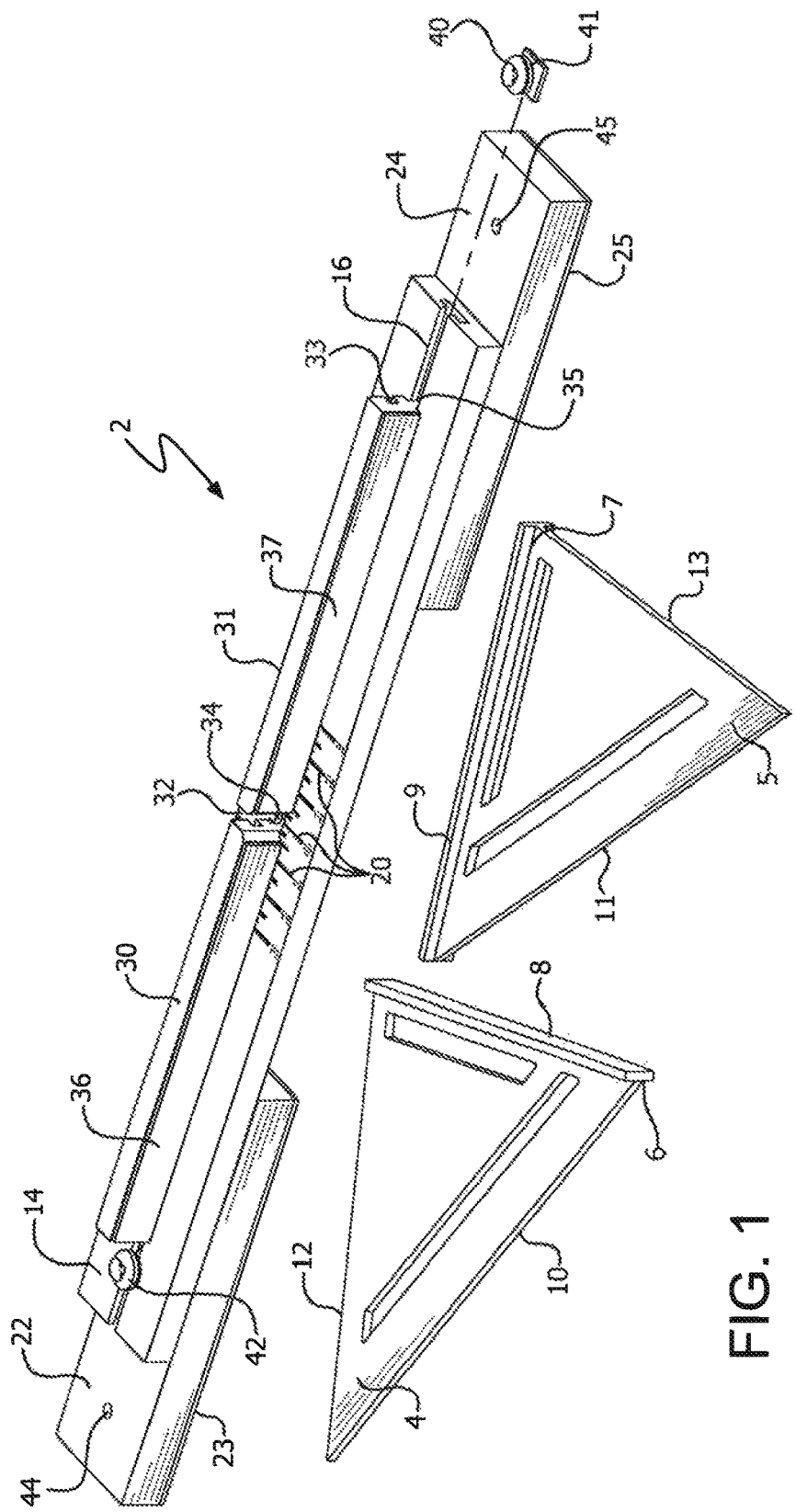
FIG. 1 is a view of the rafter angle square door clamp system in its storage or transport position.

The rafter angle square door clamp stand system 2 of the present invention comprises first angle square 4, second angle square 5, elongated tension base 14, base support members 22 and 24, first protective pad member 30, second protective pad member 31, and non-slip stop elements 40 and 42.

First angle square 4 comprises first edge 6 having outwardly extending, "T" shaped foot member 8, and non-foot member edges 10 and 12. Second angle square 5 comprises first edge 7 having outwardly extending "T" shaped foot member 9, and non-foot member edges 11 and 13.

Elongated tension base 14 comprises shaped slot 16 which extends the length of the tension base. Incremental measurement markings 20 are located on the surface of tension base 14. Base support members 22 and 24 are each rotatably secured to tension base 14 by means of screws, rivets, or equivalent connectors 26 and 27, best seen in FIGS. 4 and 5, connecting tension base 6 and base support member 22. Non-slip padding 23 and 25 are located on the bottoms of support members 22 and 24. Holes 44 and 45 are provided in order to permit system 2 to be hung for storage.

First protective pad member 30 comprises slots 32 and 34 which extend the length of the pad member. Non-slip protective padding 36 is located on the outer surface of pad member 30. Second protective pad member 31 comprises slots 33 and 35 which extend the length of the pad member. Non-slip protective padding. 37 is located on the outer surface of pad member 31.

Non-slip stop elements 40 and 42 are screw tension members, each having non-slip material layers 41 and 43.

Figure 2:
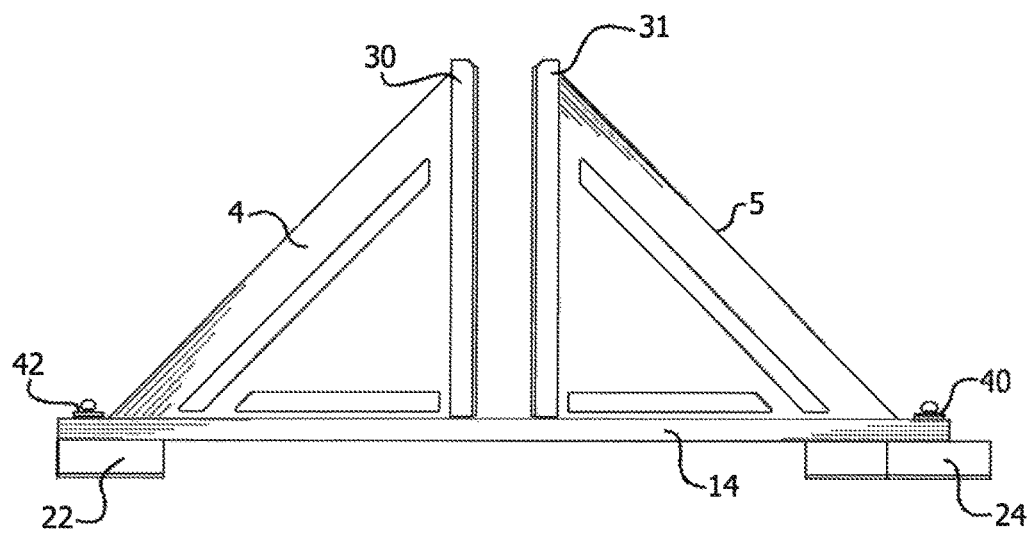
FIG. 2 is an elevation view of the rafter angle square door clamp system in its door clamping position.
Figure 3:
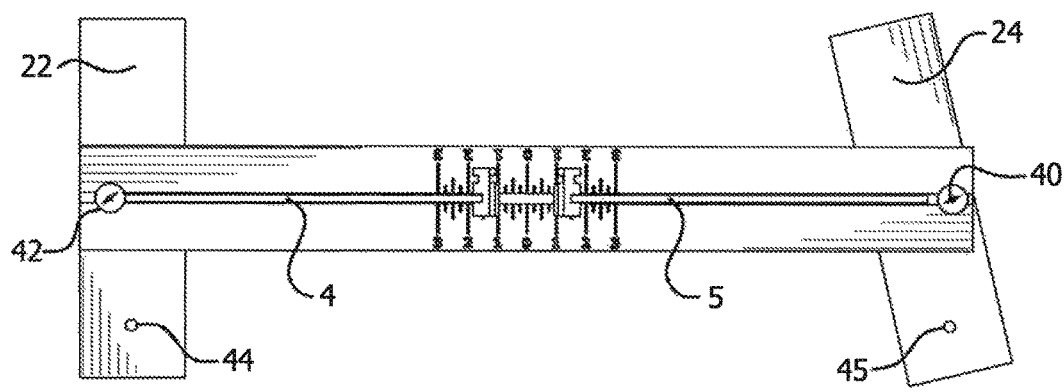
FIG. 3 is a top view of the rafter angle square door clamp system in its door clamping position.

In use for supporting a door, e.g. door 50, in a first use position, slots 32 and 33 of protective pad members 30 and 31 are slid onto edges 12 and 13 of angle squares 4 and 5. "T" shaped foot members 8 and 9 of angle squares 4 and 5 are then slid into "T" shaped slot 16 toward the center of tension base 14, until the space between the angle squares equals the width of door 50. Measurement markings 20 are used to ensure that angle squares 4 and 5 are spaced apart to accept the width of door 50. Base support members 22 and 24 are rotated so that they are perpendicular to tension base 14 and secured in this position by screw connections 26 and 27. Stop elements 40 and 42 are slid into slot 16 until they contact angle squares 4 and 5. The stop elements are then tightened to secure the angle squares to the tension base. The completed positioning of system 2 for supporting a door is best seen in FIGS. 2, 3, and 7.

Figure 7:
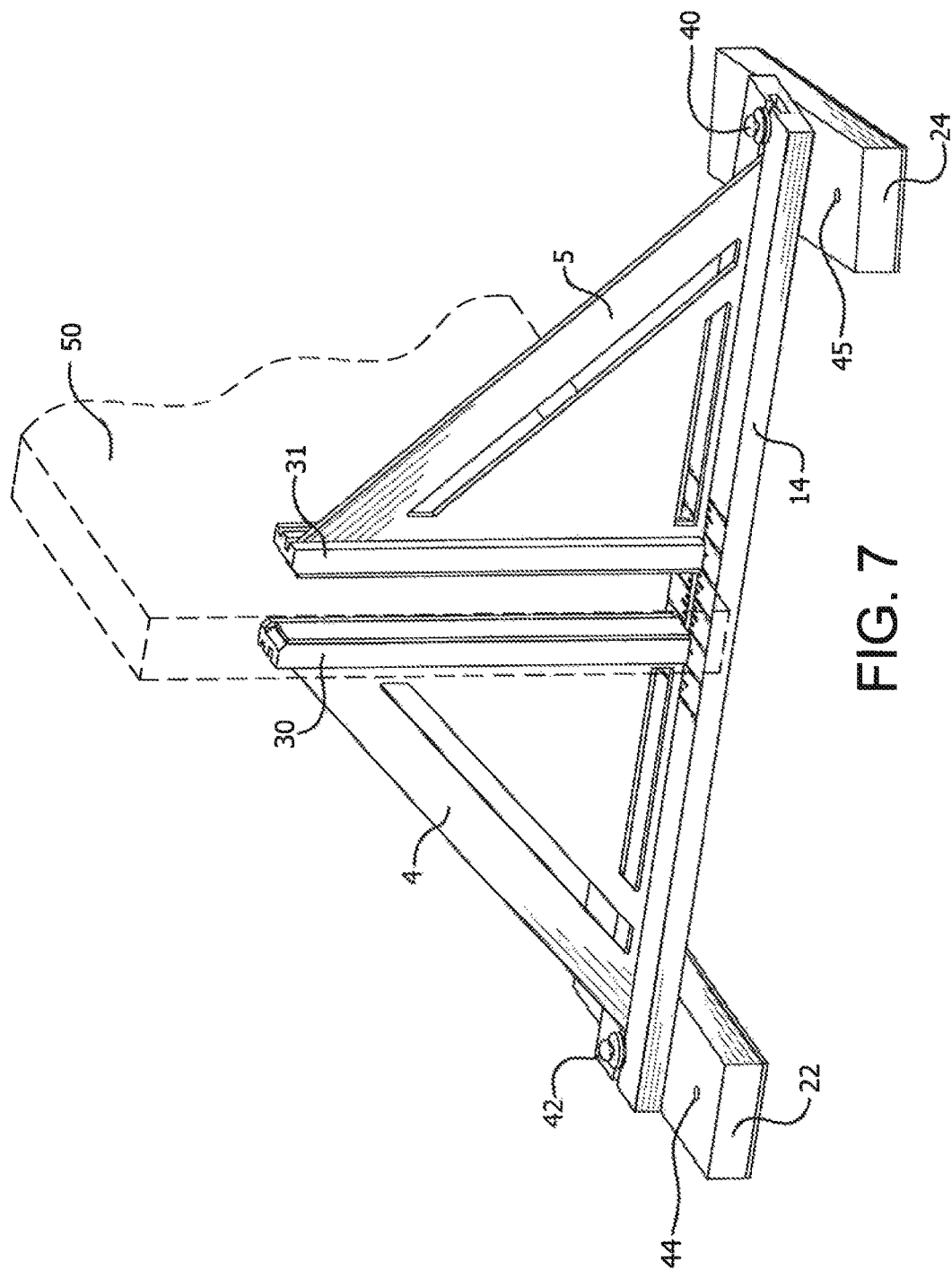
FIG. 7 is a perspective view of the rafter angle square door clamp system, shown supporting and clamping a door.

Door 50 is positioned on tension base 14, between angle squares 4 and 5, as seen in FIG. 7. The weight of door 50 puts downward pressure on tension base 14. Since tension base 14 is connected to vertical edges 12 and 13 of angle squares 4 and 5 within slot 16, the tension base will flex downward, causing the diagonal edges 10 and 11 of the angle squares to compress towards door 50, thus clamping the door in place.

Protective pad member 30, with its non-slip protective padding 36, and protective pad member 31, with its non-slip protective padding 37, attached to vertical edges 12 and 13 of angle squares 4 and 5, firmly hold door 50 and ensure it is not damaged. Stop elements 40 and 42 prevent angle squares 4 and 5 from moving backwards when door 50 is compressed and clamped. Support members 22 and 24, with their non-slip bottom padding 23 and 25, elevates tension base 14, so that it is free to flex downward when door 50 is positioned on the tension base. Support members also assist in stabilizing door 50 from any lateral movement.

Figure 4:
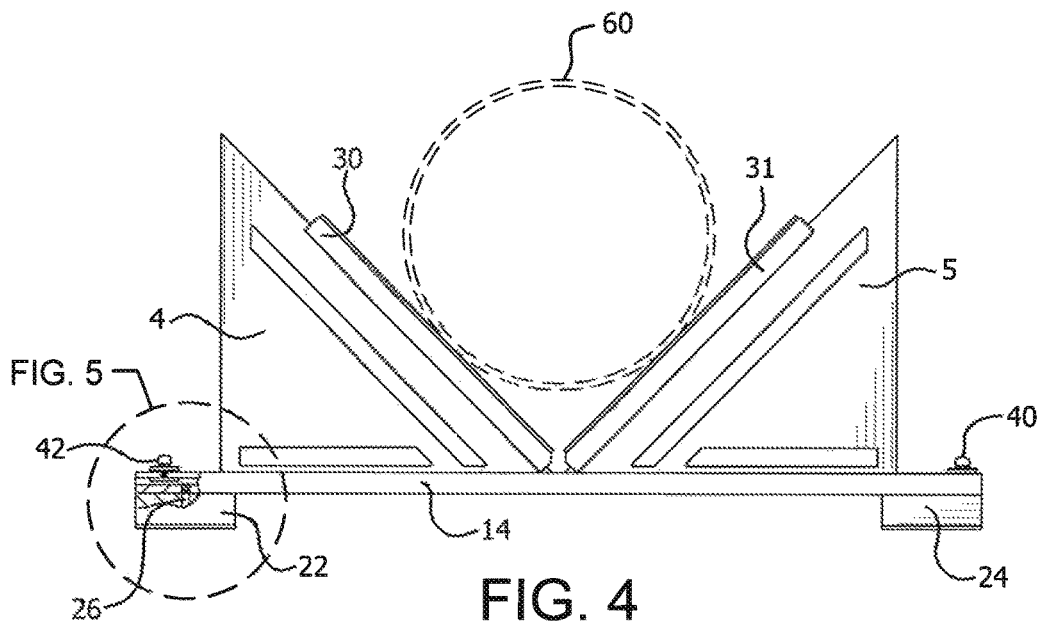
FIG. 4 is an elevation view of the rafter angle square door clamp system in its cylindrical object supporting position.
Figure 5:
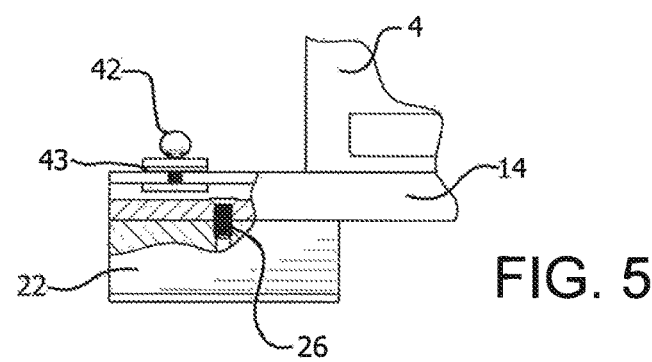
FIG. 5 is a detailed, broken away view taken from FIG. 4.
Figure 6:
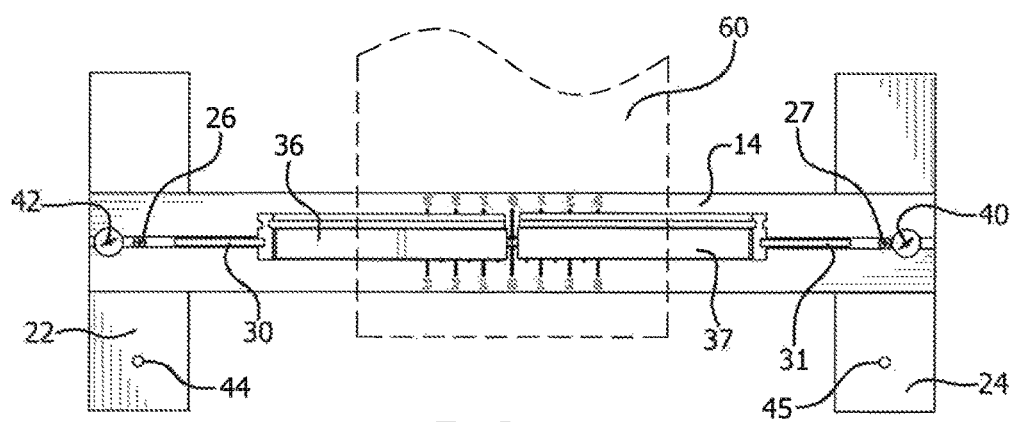
FIG. 6 is a top view of the rafter angle square door clamp system in its cylindrical object supporting position.

As seen in FIGS. 4 and 6, angle squares 4 and 5 can be inserted into slot 16 of tension base 14, such that their diagonal edges 10 and 11 face each other. Protective pad members 30 and 31 are positioned on edges 10 and 11. In this use position, system 2 can be used as a stand for working or marking out center lines on cylindrical objects 60, such as columns, pipes, and sonotubes.

System 2 can easily be transformed into a storage or transport position, shown in FIG. 1. From one of the use positions describe above, support members 22 and 24 are rotated, such that they are parallel to tension base 14 and secured in this position by screw connectors 26 and 27. Next, stop elements 40 and 42 are loosened and removed from slot 16 of tension base 14. Angle squares 4 and 5 are then slid out of and removed from slot 16 of tension base 14. Protective pad members 30 and 31 are then slid off angle squares 4 and 5 and inserted into slot 16 via their slots 34 and 35, such that the end of the pad members are adjacent to each other. Stop elements 40 and 42 are then returned to and inserted into slot 16 until they contact pad members 30 and 31. Stop elements 40 and 42 are tightened to maintain the pad members within slot 16, flush on the top surface of tension base 14.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A right angle square door clamp stand system comprising:

first and second angle squares, each said angle square having first, second, and third edges, the first edge of each angle square comprising an outwardly extending foot member which traverses the entire length of said first edge, the foot member of each angle square being perpendicular to its respective angle square;

an elongated tension base comprising a slot extending continuously and uninterrupted the entire length of the tension base;

support means rotatably connected beneath the tension base;

first and second removable and separable protective pad members, each pad member comprising pad slots;

stop means located outboard of the angle squares for securing and maintaining the angle squares on the tension base in a first position and for maintaining the protective pad members on the tension base in a second position, whereby in the first position the support means are perpendicular to the tension base and the outwardly extending foot member of each of the angle squares is secured and maintained within the slot of the tension base by the stop means so that the angle squares are perpendicular in relation to the tension base and the second edges of each of the angle squares are each located in one of the protective pad member slots, and in the second position the support means are aligned parallel to the tension base and the protective pad members are removed and separated from the angle squares and are stored on the tension base, with one of the protective pad member slots maintained within the slot of the tension base by the stop means.

2. The clamp stand system as in claim 1, wherein the outwardly extending foot members are "T" shaped and the slot means is a "T" shaped slot which conforms to the shape of the foot members, whereby foot members are slideably insertable into the slot.

3. The clamp stand system as in claim 1, wherein the support members are rotatably connected to the ends of the tension base.

4. The clamp stand system as in claim 1, wherein non-skid material is located on bottom surfaces of the support members.

5. The clamp stand system as in claim 1, wherein the stop means comprises non-slip stop elements.

6. The clamp stand system as in claim 1, wherein the tension base comprises incremental measurement lines.

\* \* \* \* \*